Figure 1A:
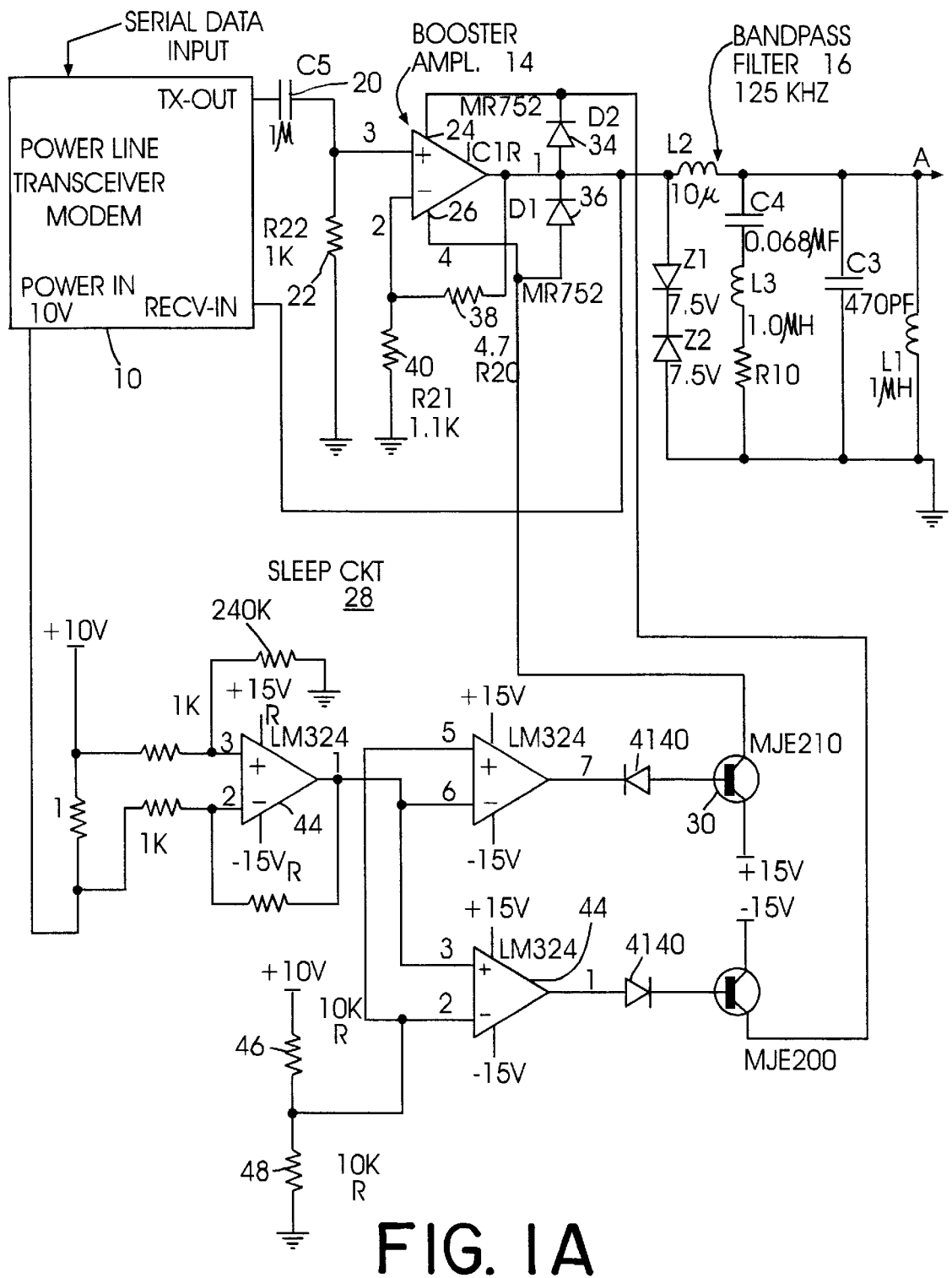

United States Patent [19]
Shrestha

[11] Patent Number: 5,870,016
[45] Date of Patent: Feb. 9, 1999

[54] POWER LINE CARRIER DATA TRANSMISSION SYSTEMS HAVING SIGNAL CONDITIONING FOR THE CARRIER DATA SIGNAL

[75] Inventor: Bickram Shrestha, Alfred Station, N.Y.

[73] Assignee: Eva Cogenics Inc Euaday Division, Victor, N.Y.

[21] Appl. No.: 794,662

[22] Filed: Feb. 3, 1997

[51] Int. Cl.[6] .................................................. H04M 11/04
[52] U.S. Cl. .............................. 340/310.02; 340/310.01; 340/310.03; 340/310.07; 375/297
[58] Field of Search ......................... 340/310.01–310.07, 340/310.08, 870.18, 870.39; 375/220, 254, 296, 297

[56] References Cited

U.S. PATENT DOCUMENTS

| | | | |
|---|---|---|---|
| 4,553,247 | 11/1985 | Harris | 375/4 |
| 4,668,934 | 5/1987 | Shuey | 340/310.01 |

OTHER PUBLICATIONS

Power Integrations Inc, Design Aid DA–8 (Mar. 1995).
PLT–20 Power Line Transciever 1995.

*Primary Examiner*—Thomas J. Mullen, Jr.
*Assistant Examiner*—Daryl C. Pope
*Attorney, Agent, or Firm*—M LuKacher

[57] ABSTRACT

Data bit error rates for power line carrier data transmission, in commercial and industrial applications, such as in office buildings and manufacturing plants is improved by connecting the power line transceiver modem to the power line via a booster amplifier and filter circuit which raises the carrier data signal level of the order of 20 dB, thereby overcoming spikes and other noise which can adversely affect the error rate. The power for the carrier data transmission system is obtained from the power lines over which the data is transmitted through filters which isolate the power supply from the power line thereby reducing the introduction of power supply noise into the power line and further improving the data bit error rate.

8 Claims, 2 Drawing Sheets

POWER LINE CARRIER DATA TRANSMISSION SYSTEMS HAVING SIGNAL CONDITIONING FOR THE CARRIER DATA SIGNAL

DESCRIPTION

The present invention relates to power line carrier data transmission systems, and particularly to a power line carrier data transmission system wherein signal conditioning is provided so as to improve the data bit error rate for signals carried by a power grid network. The invention also provides isolation of the power supply which operates the data transmission system and also other electronic components which use power line carrier data transmission for data for monitoring and control of loads such as heating, ventilating and air conditioning systems, thereby preventing power supply noise from corrupting the data signals, and further improving the data bit error rate.

Power line carrier data transmission systems have been found inadequate for the transmission of data signals (by which is meant also the reception of data signals) over power lines in industrial and commercial applications. The carrier data signals can be corrupted by noise which is prevalent in industrial and commercial environments and which is picked up on the power lines. The noise may be in the form of spikes or other interfering signals which change the waveform of the modulated carrier so that the transmission of data may be unreliable and below acceptable bit data error rate limits.

Heretofore, power line transceiver modems which generate and modulate a carrier, have been coupled directly to the power lines. The modulation of the carrier may be phase modulation and each phase shift represents a bit value of the data which is transmitted. The power lines are exposed to sources of noise, such as occur when inductive loads (motors) are switched on and off. Such noise appears as spikes which corrupt the carrier to an extent that demodulation thereof results in erroneous data. Other sources of noise are transformers, ballasts and lighting fixtures and motor controls which generate variable frequency signals which appear as phase modulation. In some applications the noise levels due to the operation of electrical machinery are of higher level than the modulated carrier produced by commercial power line data transmission modems. Accordingly, when coupled directly to the line the modem may be damaged by the noise signals.

It has been discovered in accordance with the invention that by conditioning the data carrier signal which is generated and transmitted by the power line modem prior to coupling thereof to the power line and especially conditioning which raises the level of the power line carrier signals, the unavoidable noise from the environment in which a power grid is located can be overcome and the bit data error rate of power line carrier data transmission systems which utilize power line networks can be improved to acceptable levels.

It has also been discovered that where the power supply for operating the power line carrier data transmission system, which also may be used to provide operating power for the other systems which may be used for monitoring and control of loads and providing the data signals which are transmitted over the power line, is obtained from the power line that power supply noise may be introduced into the power lines which can degrade the power line carrier and corrupt the data signal carrier waveform. Accordingly the invention provides circuitry for isolating the power supply from the power lines thereby further improving the data bit error rate.

It is, therefore, a principal object of the present invention to provide an improved power line carrier data transmission system.

It is a further object of the present invention to provide an improved power line carrier data transmission system which conditions the signals which are transmitted over a power line grid in the form of a modulated carrier, which is superimposed on the AC power which is carried by the power grid so as to counteract the effect of noise and other signals, which can corrupt the data transmitted by the carrier thereby reducing the data bit error rate.

It is still further object of the present invention to provide an improved power line carrier data transmission system having isolation between the power line grid and a power supply which derives power from the grid thereby reducing corruption of carrier data signals by power supply noise and further improving the data bit error rate of the power line carrier data transmission system.

The foregoing and other objects, features and advantages of the invention will become more apparent from reading the following description in connection with accompanying drawings wherein.

Figure 1B:
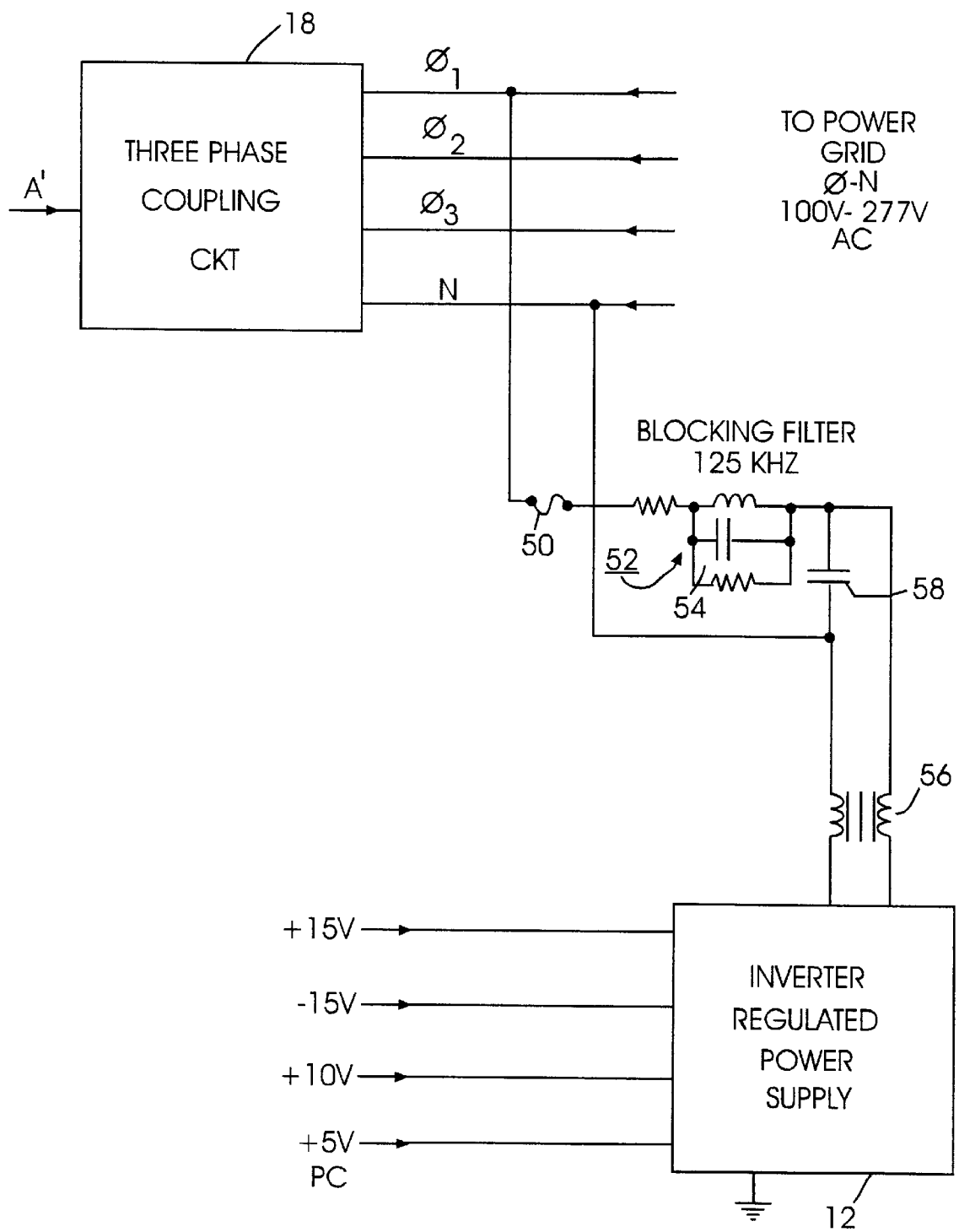

FIGS. 1(a) and 1(b) taken together and connected at A in FIG. 1(a) and A' in FIG. 1(b), is a schematic diagram of an improved power line carrier data transmission system having signal conditioning and power supply isolation and which embodies the invention.

Referring to the drawings there is shown a power line transceiver modem 10. This may be a commercially available device which receives a serial data input from a monitoring unit which translates load conditions into a binary data stream representing the load conditions. This data stream may come from an associated microprocessor computer which adds address information, identifying the load. The modem also receives power indicated at +10 v (volts) form an inverter regulated power supply 12. The transceiver modem generates a carrier signal, for example of 125 KHz and modulates that signal in accordance with serial data input by phase modulation at a data rate from 5 to 10 KB (KILOBAUD) per second. The carrier data signal is presented at its TX-OUT output. The modem 10 also receives the modulated carrier, which is transmitted from other sources, such as a central monitoring unit (a computer) at the head end of the system, over the power lines, at a RECV-IN input thereof.

After signal conditioning in a booster amplifier 14 and a band pass filter circuit 16, the carrier data signal is coupled via a three phase coupling circuit 18 to each of the three phases 1, 2 & 3 of the three phase power lines. The lines have a Neutral(N). The power line provide bi-directional transmission in transmit and receive directions over all of the phases of the power lines, thereby improving reliability by redundancy. Transmission in each direction takes place at separate times to avoid collisions.

The coupling circuit 18 may be a transformer which superimposes the carrier on the AC power between 100 volts to 277 volts AC, 50 or 60 Hz, between each phase and neutral. The power line transceiver modem 10 may be the type which is commercially available from Echelon Corporation of 4015 Miranda Avenue, Palo Alto, Calif., USA, their model PLT-20 being suitable.

It will be understood the particular values and parameters and part numbers are mentioned herein by way of example and not of limitation upon the scope of the invention.

The transmitted phase modulated carrier signal from TX-OUT is coupled from the junction of a capacitor 20 and resistor 22 to the input of the booster amplifier 14. The booster amplifier includes an analog operational amplifier, such as a model LM12 available from National Semiconductor Corp. This operational amplifier receives its rail voltages at rail input 24 and 26 from a sleep circuit 28. The sleep circuit will be described in detail below. Briefly, the sleep circuit detects the current drawn from the power supply 12 by the modem 10. When the modem is not generating a carrier for transmission, then the power from the +15 v and −15 v power supply terminals, to the rail terminals 24 and 26 is switched off via transistors 30 and 32 in the sleep circuit. This places the amplifier 14 in an off condition, reducing power drain from the amplifier and improving the efficiency of the signal conditioning circuitry.

The output of the operational amplifier in the booster amplifier 14 also is connected via diodes 34 and 36 to the power supply terminals +15 v and −15 v, via the switching transistors and 30 and 32, when the amplifier is active. The diodes 34 and 36 shunt any spikes or high (over ±15 v) level signals which are transmitted from the power lines by way of the coupling circuit 18 and the filter 16 to the amplifier, thereby protecting the amplifier against over voltage conditions at the output thereof.

The amplifier 14 has feedback via a circuit having resistors 38 and 40, which sets the gain of the amplifier so that the amplifier provides of the order of 20 dB of gain. This boosts the output voltage of the carrier signal to approximately 15 volts peak to peak. Accordingly, the data signal level is increased to an extent which overcomes the corrupting effect of noise which may be induced into or is otherwise applied to the power line phases, and which may affect adversely the data bit error rate of the transmitted signals. The waveform of the transmitted signals is, therefore, preserved, even though corrupting noise exists on the data transmission network provided by the power grid.

The operational amplifier, which is selected for use in the booster amplifier 14, desirably contains input protection against over-voltage signals from the modem 10 and may automatically shut down and become inactive in the event of such over voltage conditions. Also, the operational amplifier may have output power limiting which will protect the amplifier in the event that, during servicing or otherwise, a short is placed across the output of the amplifiers thereof. Thermal effects may also be sensed and result in amplifier shutdown. These protective features are optional and are provided in the operational amplifier chip which is supplied by the manufacturer thereof.

The band pass filter 16 is tuned to the carrier frequency, for example 125 KHz. Accordingly, it provides a low output impedance at 125 KHz, but a higher output impedance, starting at, for example, 5 KHz above and below 125 KHz. The filter itself has a paid of Zener diodes Z1 and Z2 in back to back configuration. These diodes, Z1 and Z2, each have Zener voltages of about 7.5 volts and limit the voltage of the received carrier signal which is applied to the receive input RECV-IN of the modem 10. The filter is of a backwards L configuration with inductors L1 and L3 connected in shunt and L2 connected in series. L3 is in an LCR shunt branch with C4 and R12. A capacitor C3 is connected across L1. The booster amplifier 14 and band pass filter 16 condition the signal and provide isolation for out of band, received signals, thus effectively conditioning received signals from the power line.

The sleep circuit 28 uses a current sensing operational amplifier 41 which provides an output to operational amplifiers 42 and 44, which are connected as comparators. These amplifiers 42 and 44 turn on and off, the switching transistors 30 and 32, simultaneously, turning them on in the case of a current which is over a level preset by resistors 46 and 48 in a voltage divider from +10 v. Accordingly, when the carrier is being generated in the modem 10, the transistors 30 and 32 will be switched on. When the carrier is not being transmitted the transistors 30 and 32 are switched off.

The power supply 12 is preferably an inverter power supply, having a regulator circuit which maintains the output voltage at the required voltages of +15 v and −15 v. The power supply may contain additional regulators for regulating the 10 v and 5 v outputs. These regulators may be Zener voltage regulators of a conventional type. The power supply 12 may also be conventional, utilizing as an oscillator chip manufactured by Power Integrations, Inc. of Mountain View Calif. Feedback may be provided from a tickler winding of the output transformer of the inverter 12 via a opto-isolator, so as to set and regulate the 15 volt output voltages. Further information concerning this type of inverter regulated power supply is available from Power Integrations, Inc. in their design aid DA-8 (March 1995).

The power supply 12 receives AC input voltage between one of the phases (1 may be used as shown) and a neutral of the power grid. The connected phase (1 on the drawing) is connected to a fuse 50 and a blocking filter circuit 52. The blocking filter 52 includes a tank circuit 54 tuned to the carrier frequency (125 KHz). The blocking filter introduces impedance between a common mode filter, consisting of balanced coils 56 and a capacitor 58. This common mode filter is connected between the 1 line and neutral. The impedance connected across the power line is thereby increased at the carrier frequency. Noise generated at or about the carrier frequency in the power supply 12, for example when it switches to provide inverter operation, is isolated by the filter 52 which provides additional isolation to the isolation provided by the common mode filter 56, 58.

From the foregoing description it will be apparent that there has been provided an improved power line carrier data transmission system, having signal conditioning and isolation, which makes power line data transmission effective and practicable for commercial and industrial applications. The power line data transmission system may be part of a monitoring and control system for various loads (motors, chillers, et cetera) in an industrial or commercial heating ventilating system so as to insure efficient and safe operation of the loads and conserve electric power. Variations and modifications in the herein described system, within the scope of the invention will undoubtably suggest themselves to those skilling in the art. Accordingly, the foregoing description should be taken as illustrative and not in a limiting sense.

I claim:

1. In a power line carrier data transmission system having carrier transmission means for generating and receiving a modulated carrier via power lines, the improvement comprising means between the transmission means and the power lines for boosting the level of the modulated carrier signal sufficient to overcome noise appearing on the power lines, and means for coupling the output of said boosting means to the power lines which presents a high impedance at the carrier frequency, said coupling means further comprising a three phase coupling circuit connected between the power lines and a filter tuned to the frequency of said carrier.

2. The invention in accordance with claim 1 where said boosting means is an amplifier having an input coupled to receive modulated carrier signals from the carrier transmission means and including level setting means for providing an output level increase of the order of 20 dB of the modulated carrier signal.

3. The invention in accordance with claim 2 further comprising means for detecting when the transmitting and receiving means is generating a carrier, and means for placing the amplifier in an inactive state when the transmitting means is not generating the carrier.

4. The invention in accordance with claim 1 further comprising an inverter regulated power supply connected to said power lines via a blocking filter tuned to the frequency of said carrier.

5. The invention in accordance with claim 4 further comprising a common mode filter connected across said power lines to cancel noise which appear across said power lines before said noise reaches said inverter power supply.

6. In a power line carrier data transmission system having carrier transmission means for generating and receiving a modulated carrier via power lines, the improvement comprising means for boosting the level of the modulated carrier signal sufficient to overcome noise appearing on the power lines, means for coupling the output of said boosting means to the power lines which presents a high impedance at the carrier frequency, said boosting means being an amplifier having an input coupled to receive modulated carrier signals from the carrier transmission means and including level setting means for providing and output level increase of the order of 20 db of the modulated carrier signal, and wherein said amplifier is an operational amplifier and further comprising means connected across the output of the operational amplifier for preventing the output of the operational amplifier from increasing to voltage levels exceeding levels which can damage the operational amplifier.

7. In a power line carrier data transmission system having carrier transmission means for generating and receiving a modulated carrier via power lines, the improvement comprising means for boosting the level of the modulated carrier signal sufficient to overcome noise appearing on the power lines, means for coupling the output of said boosting means to the power lines which presents a high impedance at the carrier frequency, and wherein said coupling means provides, isolating means for isolating said power lines from said generating and receiving means, said isolating means is a band pass filter which has a series leg and a shunt leg, said series leg providing a connection to a received signal input of a modem which provides said transmission means, and said filter being tuned to the carrier frequency of the signal generated by the modem.

8. The invention in accordance with claim 5 further comprising means connected across to receive input of the modem across the series leg and the shunt leg of the filter for preventing voltages above certain peak to peak voltages of the carrier signal from being presented across the received signal input of the modem.

\* \* \* \* \*